Patented Nov. 4, 1941

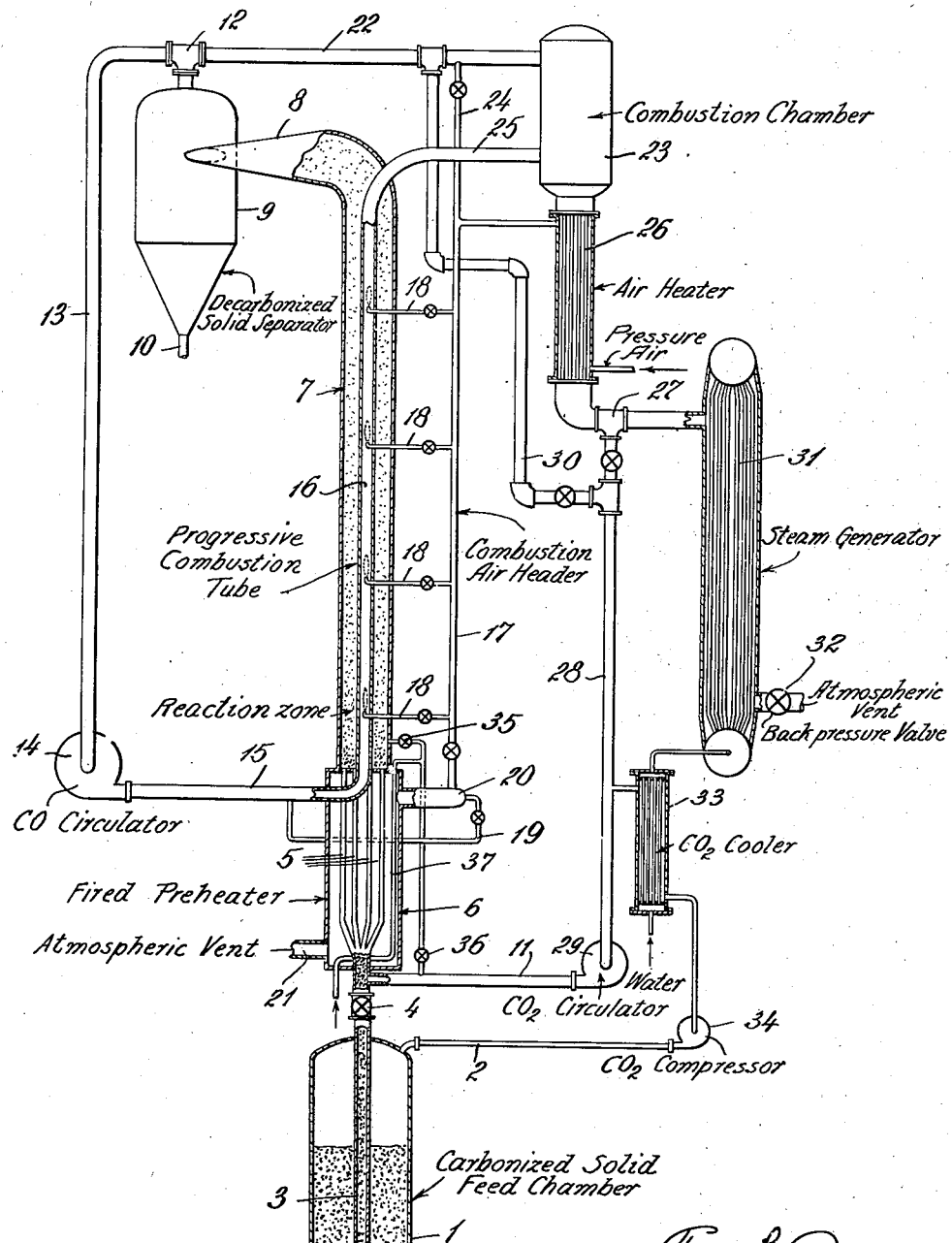

2,261,151

UNITED STATES PATENT OFFICE 2,261,151

METHOD FOR RECOVERING SPENT ADSORBENT MATERIAL

Fred L. Fast, Woodbury, N. J., assignor to Socony-Vacuum Oil Company, Incorporated, New York, N. Y., a corporation of New York Application October 1, 1938, Serial No. 232,745

4 Claims. (Cl. 252—280)

Numerous processes such as the percolation filtration of mineral petroleum oils; clarification of oils, fats, sugar, etc., by filtration, and similar processes result in contamination of the adsorbent mass used by combustible carbonaceous material. Similarly many catalytic processes using as a catalyst an adsorbent or refractory contact mass which is catalytic in nature or has a catalyst material supported upon it or impregnated in it also contaminate the contact mass with a combustible carbonaceous material. It is customary to regenerate such adsorbents and contact masses by burning off the contaminant. This invention is specifically concerned with such processes of regeneration.

Such processes must operate within narrowly defined limits of temperature. The temperature must be sufficiently high to enable combustion to take place, yet it must not be too high, for practically all of the adsorbents so used may be permanently damaged by temperatures readily reached. As an illustrative example, without being limited thereto, the regeneration of spent fuller's earth from a process of petroleum refining will be considered. This material may be damaged seriously by exposure to temperatures of 1000°–1200° F. for any length of time. Yet it must be heated to at least about 800°–850° F. to undergo combustion, and the combustion is highly exothermic. Consequently, such regenerations are difficult to control.

This invention has for a principal object the provision of a process for the regeneration of spent adsorbent material wherein the material undergoing regeneration is subjected to an endothermic regeneration reaction in a cyclic process wherein an exothermic reaction is separately conducted, the endothermic reaction and the exothermic reaction being conducted in parallel to secure control of the regeneration. Other objects are in part obvious and in part appear hereinafter.

This invention is based upon the carrying out of the indicated regeneration as an endothermic reaction, products from which undergo an exothermic reaction so conducted as to supply heat for the primary endothermic reaction.

To enable convenient explanation of this invention, reference is made to the drawing attached to this specification. The single figure of this drawing is a diagrammatic representation of an apparatus suitable for carrying out any process, wherein 1 is a chamber containing spent adsorbent to be regenerated, and 2 is a pipe through which compressed gas is led thereinto. Pipe 3 depends toward the bottom of 1 and when valve 4 is opened, adsorbent will pass upward through 3, 4, tubes 5 in preheater 6, and then through the annular passage within 7, where it is regenerated by a reaction hereinafter explained. Passing from regenerator 7 through gooseneck 8 to collector 9, the regenerated adsorbent is separated from the gases accompanying it and removed from the system by pipe 10. Regeneration medium introduced by pipe 11 is carbon dioxide gas, or carbon dioxide gas admixed with nitrogen or air, in such ratios of mixture that any reaction between the regeneration medium and the carbonaceous deposit upon the spent adsorbent is an endothermic reaction, such as the reaction

$$CO_2 + C \rightarrow 2CO$$

which predominates.

The effluent gases from regeneration, rich in carbon monoxide, pass from collector 9 into pipe 12, whence a portion of these gases are lead through pipe 13 by gas pump 14, and introduced through pipe 15 into combustion tube 16, which is centrally disposed in regenerator 7. Air for the exothermic combustion of carbon monoxide to carbon dioxide is provided from pipe 17 through a plurality of spaced inlets 18. The exothermic combustion occurring within tube 16 is controlled to furnish a proper amount of heat for the endothermic regeneration occurring in regenerator 7 surrounding tube 16. A portion of the carbon monoxide-containing gas is diverted from pipe 15 by pipe 19 and lead to burner 20, wherein it is burned to furnish heat for preheater 6, the flue gases from which are exhausted to atmosphere through vent 21.

A further portion of the gases from regeneration, rich in carbon monoxide, are led by pipe 22 to combustion chamber 23, to which air is introduced from pipe 17 by pipe 24. Within chamber 23, these gases are subjected to exothermic combustion to carbon dioxide. The carbon dioxide-containing gases from combustion tube 16 are led into chamber 23 by pipe 25.

The hot gases from combustion chamber 23 pass out through and are partially cooled in air preheater 26 through which compressed air is led from a source not shown, the air so heated furnishing supply for air pipe 17, previously mentioned. Partially cooled gases from 26 pass to pipe 27, from which a portion pass through pipe 28 and gas pump 29 to pipe 11 to be introduced to the regeneration as a source of carbon dioxide. Pipe 30, connecting pipes 28 and 22 is for use in starting up during the period prior to the establishment of normal operating atmospheres within the various portions of the system. A portion of the partially cooled gases from pipe 27 are passed through a waste heat boiler 31 and exhausted to atmosphere through vent valve 32. A portion of the gas from pipe 28, after passing through feed water heater 33 wherein it is cooled, is compressed by compressor 34 and passed through pipe 2 to vessel 1 to furnish the motive power to introduce spent adsorbent therefrom into the system. If desired, steam may be admitted to the regeneration reaction either at the regenerator by valve 35 or before preheat by valve 36. This steam may be superheated, if desired, by passage through the preheater in pipe 37, as shown.

It will be observed that the principle of operation followed herein is that of a wholly endothermic regeneration reaction conducted in heat exchange relationship with an exothermic combustion of regeneration products and controlled by the conduct of such exothermic reaction. The control is achieved by varying the intensity of the burning of carbon monoxide in pipe 16, as by varying the amount of gas introduced by pump 14 and air introduced by pipe 18.

It is to be preferred, in operation of this process, that the adsorbent to be regenerated should be at least partially freed of those contaminants which can be removed by physical means. For example, fuller's earth used in petroleum filtration should be steamed until substantially free of entrained oil or wash liquor prior to being charged to the system herein set forth.

As indicated above, the regeneration medium need not be entirely oxygen-free. In fact, it is likely that it will not be solely a mixture of carbon dioxide and nitrogen such as would result from complete consumption of air. It will normally contain, in addition to these, some carbon monoxide, some water vapor and some oxygen. It is important, though, that the relative percentages of these materials should be sufficiently low so that the regeneration reaction is substantially endothermic in nature, resulting in the production of substantial relative proportion of carbon monoxide.

It is recognized that there are known processes of regeneration wherein the spent adsorbent is regenerated in an atmosphere which may be diluted by the return thereto of flue gas produced by the regeneration, which flue gas contains carbon dioxide, the dilution probably resulting in some incomplete combustion with resulting production of carbon monoxide. This process does not partake of that nature being conducted with a regenerating medium sufficiently devoid of free oxygen, and sufficiently rich in carbon dioxide, for the predominant reaction to be the endothermic reaction between carbon and carbon dioxide to form carbon monoxide. It is also recognized that there are known processes wherein the spent adsorbent is regenerated in an isolated atmosphere, (which may be reducing) in a passage surrounded by a combustion to which flue gas from said combustion has been returned to control its intensity. It will be recognized that this principle is not made use of here.

It will further be recognized, so far as apparatus is concerned, that many other forms of apparatus may be provided in which the process may be carried out, yet that all these are a part of my invention, subject to limitations as claimed. For example, since the heat demand for the endothermic reaction $CO_2+C \rightarrow 2CO$ for one pound of carbon contaminant is less than the corresponding heat available from the reaction $2CO+O_2 \rightarrow 2CO_2$, there are provided two combustion zones, viz., 16 and 23. It will be obvious that either a portion of the gases may be burned in 16, or that all may be burned in 23 and a portion lead in heat exchange with 7 to provide needed heat, or all may be burned in 23 and some fluid heat transfer medium may be used to transfer heat from 23 to 7.

While it is preferable to conduct the operation shown under pressure slightly above atmospheric to prevent infiltration of unwanted air, the pressure may be increased considerably above this, if desired, to secure more rapid and more thorough reaction.

The apparatus features disclosed herein are claimed in my divisional application S. N. 370,753, filed December 19, 1940.

I claim:

1. An improved process for regenerating spent adsorbents contaminated with carbonaceous impurities by oxidizing said carbonaceous impurities which comprises passing spent adsorbents through a regenerating zone under regenerating conditions in intimate contact with gaseous regenerating medium composed of sufficient carbon dioxide that said carbonaceous impurities are oxidized therefrom endothermically to form essentially carbon monoxide, oxidizing said carbon monoxide exothermically to carbon dioxide in a combustion zone in indirect heat exchange relationship with said regenerating zone whereby heat produced therein is transferred into said regenerating zone, introducing the carbon dioxide produced in said combustion zone into said regenerating zone to endothermically oxidize further quantities of carbonaceous impurities on said spent adsorbents to carbon monoxide, and adjusting the amount of carbon monoxide oxidized exothermically so that substantially the same amount of heat is evolved thereby as is required for regenerating said spent adsorbents.

2. An improved process for regenerating spent adsorbents contaminated with carbonaceous impurities by oxidizing said carbonaceous impurities which comprises preheating said spent adsorbents to substantially regeneration temperature, passing said preheated spent adsorbents through a regenerating zone under regenerating conditions in intimate contact with gaseous regenerating medium composed of sufficient carbon dioxide that said carbonaceous impurities are oxidized therefrom endothermically to form essentially carbon monoxide, oxidizing said carbon monoxide exothermically to carbon dioxide in a combustion zone in indirect heat exchange relationship with said regenerating zone whereby heat produced therein is transferred into said regenerating zone, introducing the carbon dioxide produced in said combustion zone into said regenerating zone to endothermically oxidize further quantities of carbonaceous impurities on said spent adsorbents to carbon monoxide, and adjusting the amount of carbon monoxide oxidized exothermically in said combustion zone so that substantially the same amount of heat is evolved thereby as is absorbed in the regenerating zone by endothermic oxidation of said carbonaceous impurities to carbon monoxide.

3. An improved process for regenerating spent adsorbents contaminated with carbonaceous impurities by oxidizing said carbonaceous impurities which comprises passing spent adsorbents through a regenerating zone under regenerating conditions in intimate contact with gaseous regenerating medium composed of sufficient carbon dioxide that said carbonaceous impurities are oxidized therefrom endothermically to form essentially carbon monoxide, oxidizing a part of said carbon monoxide exothermically to carbon dioxide in a combustion zone in indirect heat exchange relationship with said regenerating zone whereby heat produced therein is transferred into said regenerating zone, oxidizing a further part of said carbon monoxide exothermically to carbon dioxide in an independent combustion zone, using heat produced in said independent combustion zone to preheat spent adsorbents passing into said regenerating zone, introducing the carbon dioxide produced in both of said combustion zones into said regenerating zone to endothermically oxidize further quantities of carbonaceous impurities on said spent adsorbents to carbon monoxide, and adjusting the amount of carbon monoxide oxidized exothermically in said first combustion zone so that substantially the same amount of heat is evolved thereby as is required for renegerating said preheated spent adsorbents.

4. The process of regenerating spent petroleum processing adsorbents that are contaminated with carbonaceous petroleum impurities by oxidizing said carbonaceous impurities which comprises passing the spent adsorbents through a regenerating zone in intimate contact with a gaseous regenerating medium which oxidizes said carbonaceous impurities endothermically from said spent adsorbents to form essentially carbon monoxide, oxidizing said carbon monoxide exothermically to carbon dioxide in a combustion zone in indirect heat exchange relationship with said regenerating zone whereby heat produced therein is transferred into said regenerating zone, introducing carbon dioxide produced in said combustion zone into said regenerating zone to endothermically oxidize carbonaceous matter on further quantities of said spent adsorbents to carbon monoxide, and adjusting the amount of carbon monoxide oxidized exothermically in said combustion zone so that substantially the same amount of heat is evolved thereby and transferred into said regenerating zone as is required in said regenerating zone for properly regenerating the spent adsorbents passing therethrough.

FRED L. FAST.